Sept. 12, 1950

J. R. WEEKS, JR 2,522,151

CIRCUIT FOR TESTING THE DIELECTRIC
STRENGTH OF INSULATING MATERIAL
AND RECORDING PUNCTURE POINTS

Filed March 13, 1948

INVENTOR
J. R. WEEKS, JR.

BY J. MacDonald

ATTORNEY

Patented Sept. 12, 1950

2,522,151

UNITED STATES PATENT OFFICE 2,522,151

CIRCUIT FOR TESTING THE DIELECTRIC STRENGTH OF INSULATING MATERIAL AND RECORDING PUNCTURE POINTS

John R. Weeks, Jr., South Orange, N. J., assignor to Bell Telephone Laboratories, Incorporated, New York, N. Y., a corporation of New York Application March 13, 1948, Serial No. 14,706

2 Claims. (Cl. 175—183)

1

This invention relates to testing circuits and more specifically to a testing circuit arrangement for counting the number of failures in insulation covered electrical conductors or in dielectrics for example as used in electrostatic condensers and the like.

In the manufacture of condensers of the type above referred to, it is customary in some cases to apply as by vaporization a thin coating of aluminum or zinc on a dielectric in the form of a paper band serving as a carrier for the metal layer.

In such condensers a puncture occurring at a weak point in the dielectric causes the metal coating to melt or vaporize over a larger area around the puncture point than the area of the dielectric destroyed with the result that the point of puncture is insulated after the puncture, while the dielectric is still present around the punctured point so that the condenser is restored to an operating condition. The condenser is thus said to heal up at the place where the puncture occurs and while the condenser during normal working conditions heals up of itself when a puncture takes place, it has been found preferable to effect the puncturing of low dielectric strength areas prior to the use of such a condenser in actual service.

The object of the present invention therefore is the provision of a testing circuit arrangement whereby failures in the form of punctures in the insulating material or in the dielectric of a condenser under test cause the operation of a counting mechanism for recording the number of such failures in a simple and positive manner.

Figure 1:
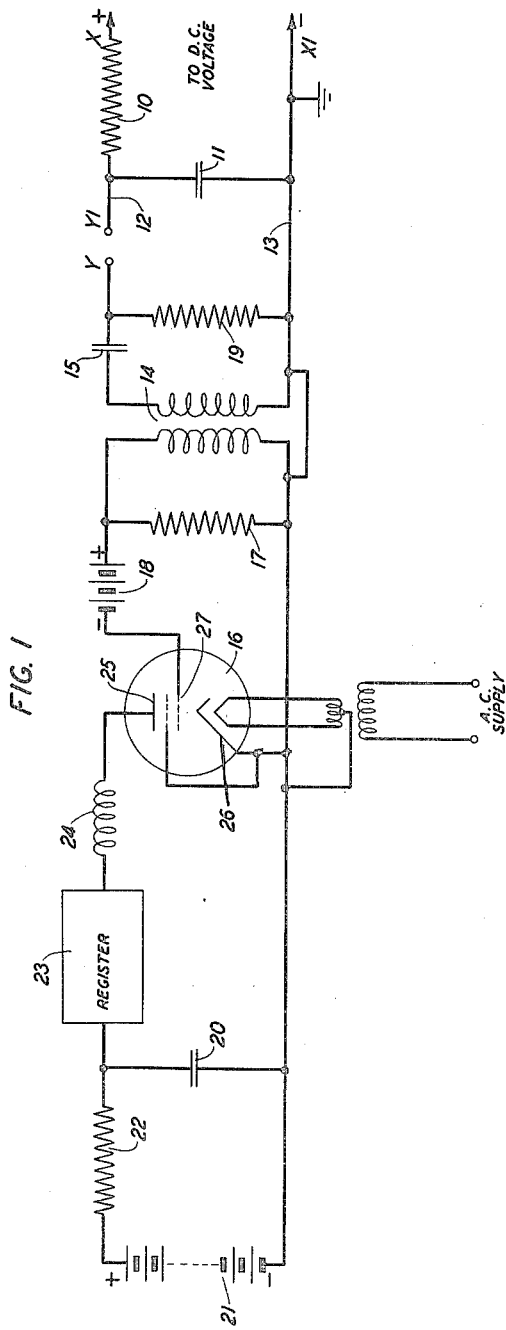
Fig. 1 is a diagrammatical view of the testing circuit.
Figure 3:
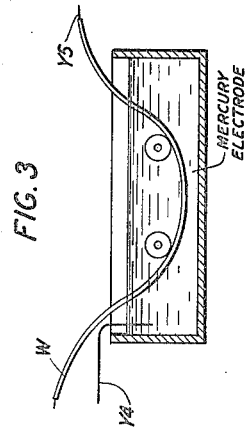
Fig. 3 is a view of an arrangement for testing the insulation on conducting wire.
Figure 2:
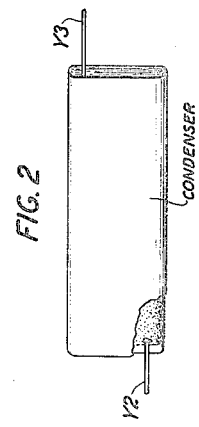
Fig. 2 is a view of a condenser to be tested for punctures or other failures in the dielectric.

In the drawing which shows the testing circuit arrangement of this invention, a direct current source, not shown, is connected to the terminals X and XI with a 51,000-ohm series resistance 10 and a shunt condenser 11 connected across the leads 12 and 13. The lead 12 is provided with terminals Y and YI for connecting with the terminals Y2 and Y3 of the condenser shown in Fig. 2 to be tested or with the terminals Y4 and Y5 for the testing of the insulating material on the wire W, the terminal Y4 as shown in Fig. 3 connecting with a mercury electrode into which the insulated wire is drawn in any suitable manner, while the conductor itself con-

2 nects with the other terminal of the testing circuit.

A voltage surge caused by a failure in the test condenser energized from the direct current supply connected to the terminals X and XI is applied to the primary of a transformer 14 through a condenser 15 provided to prevent any direct current which might flow through a resistance 19 of approximately 5,000 ohms from flowing through the primary winding of the transformer 14. This transformer steps up the voltage surge and applies it to the grid 27 of a thyratron tube 16 which is shown in the circuit as a shield grid thyratron tube. A dumping resistance 17 of approximately 0.51 megohm is connected across the high side of the transformer to prevent any undesirable voltage alternations being set up in the transformer. A negative voltage is applied to the grid 27 of the thyratron by a battery 18 of substantially 6 volts for the purpose of maintaining this tube normally in a non-conducting state.

When the voltage from the secondary winding of the transformer is impressed across a resistance 17 of proper magnitude and direction so as to reduce the grid potential sufficiently relative to the cathode 26 of the tube, the thyratron suddenly becomes conducting, that is, in this condition current is readily conducted from the plate 25 to the cathode of the tube.

A condenser 20 is connected across a 120-volt battery 21 through a resistance 22 of approximately 30,000 ohms. When the thyratron tube becomes conducting, the condenser 20 discharges with the current flowing in a conducting path including a register device 23, a retardation coil 24 and the plate 25 to cathode 26 of the thyratron tube. The discharge current actuates the register device 23 for counting the voltage pulses and therefore the number of failures in the condenser under test. As the condenser 20 approaches a discharge condition the decreasing discharge current passing through retardation coil 24 induces a small negative potential on the plate 25 of the thyratron so as to render the thyratron tube non-conducting. The resistance 17 dissipates any excess energy in the pulse, and the grid 27 returns to its normal potential of substantially 6 volts, as above mentioned.

In a typical example of operation of the circuit arrangement of this invention, an instantaneous dielectric failure in the condenser under test causes a voltage surge to be set up across the 5,000-ohm resistance in series with the test condenser. The energy for the voltage surge is drawn from the power source supplying the direct current voltage to the test condenser.

This voltage surge is applied to the primary of transformer 14 through the condenser 15. The latter, as above described, prevents any direct current which might flow through the 5,000-ohm resistance from flowing through the primary winding of the transformer.

The transformer steps up the voltage surge and applies it to the grid 27 of the thyratron tube 16. The damping resistance 17 which is connected across the high voltage side of the transformer prevents any undesirable voltage alternation being set up in this transformer. The negative voltage is applied to the grid of the thyratron tube by the battery 18 so as to maintain this tube normally in a non-conducting state. The voltage pulse swings the grid of the tube positive which then becomes conducting, the characteristics of the tube being such that it stays conducting until the plate is rendered slightly negative. When the tube becomes conducting the condenser 20 which is charged to 120 volts through the 30,000-ohm resistance by the battery 21 discharges, the current flowing from the positive side of the condenser through the register 23, the retardation coil 24, the thyratron tube and back to the negative side of the condenser causing the register to operate. The flow of current through the retardation coil sets up a voltage potential at the time the condenser is nearly discharged which swings the plate of the thyratron slightly negative and stops the flow of current. The thyratron is in this manner restored to its initial non-conducting state. The condenser 20 then recharges through the 30,000-ohm resistance 22 and the circuit is ready to record another instantaneous dielectric failure.

The time constant of the electrical part of the circuit and the register are such that the circuit will record about ten dielectric failures in a second.

In actual use of the circuit of this invention the values of capacitance and resistance for the resistor 10 and capacitance of condenser 11 have been chosen to reduce the rate of charging the test condenser to an extent such that the resulting effect on the grid potential during the time of charging is insufficient to render the thyratron tube conductive so that the register records only temporary failures in the test condenser.

While the testing circuit of this invention has been described for use primarily for the testing of metallized dielectric as used in condensers it is obvious that it may be used for other purposes such as the testing of insulated wire in which case the wire serves as one of the electrodes or the testing of plain dielectric in the form of paper bands or other materials in which case the dielectric is passed between rollers forming the electrodes connected to the terminals Y and Y1 above-mentioned.

What is claimed is:

1. Apparatus for testing electrical insulation and recording punctures therein comprising, in combination, a source of unidirectional voltage, circuit means including a series resistance for applying the source across the insulation under test in series with a second resistance, a step-up transformer having a primary and a secondary winding, the primary winding in series with a condenser being connected across the second resistance, a thyratron tube having at least a cathode, a control grid and an anode, said cathode and control grid being connected across the secondary winding in series with a second source of unidirectional voltage, said second source biasing the control grid normally negatively to the cathode, a second condenser connected at one terminal to the cathode, an inductance connected at one terminal to the anode, a voltage surge registering means connected between the second condenser and the inductance at the respective other terminals thereof and a third source of unidirectional voltage connected across the second condenser in series with a third resistance.

2. Apparatus for testing a metal-coated sheet of insulating material and recording puncture points present in the sheet comprising in combination an electrical current supplying system into which the metal coated sheet can be connected, a second electrical current supplying system, a voltage register in said second electrical current supplying system, a thyratron tube normally maintained in the non-conducting condition in said second current supplying system and operable as a valve to control the application of voltage surges to said voltage register, a condenser connected across said second current supplying system and operable to discharge directly into said voltage register when said thyratron tube is rendered conducting, a retardation coil in series connection with said voltage register and said thyratron tube and operable to induce a potential on the plate of said thyratron tube to restore said thyratron tube to a non-conducting condition after said condenser discharges into said voltage register, and a step-up transformer electrically connecting the first electrical current supply system to said second current supply system, and operable to feed into said thyratron tube a voltage surge sufficient to render said thyratron tube conducting when a puncture is present in the metal coated sheet under test.

JOHN R. WEEKS, Jr.

REFERENCES CITED

The following references are of record in the file of this patent:

UNITED STATES PATENTS

| Number | Name | Date |
|---|---|---|
| 2,220,489 | Lowkrantz | Nov. 5, 1940 |
| 2,436,615 | Stearns | Feb. 24, 1948 |